United States Patent
Mader et al.

(10) Patent No.: US 9,837,118 B1
(45) Date of Patent: Dec. 5, 2017

(54) DETERMINING THERMAL GRADIENT OF HEAT-ASSISTED MAGNETIC RECORDING HOTSPOT BASED ON TIMING ERRORS

(71) Applicant: Seagate Technology LLC, Cupertino, CA (US)

(72) Inventors: Drew Michael Mader, Minneapolis, MN (US); Tim Rausch, Farmington, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/447,337

(22) Filed: Mar. 2, 2017

(51) Int. Cl.
| | |
|---|---|
| *G11B 11/00* | (2006.01) |
| *G11B 20/18* | (2006.01) |
| *G11B 5/012* | (2006.01) |
| *G11B 5/09* | (2006.01) |
| *G11B 5/00* | (2006.01) |

(52) U.S. Cl.
CPC .......... *G11B 20/1816* (2013.01); *G11B 5/012* (2013.01); *G11B 5/09* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 5,165,089 | A * | 11/1992 | Jaquette | G11B 7/005 360/45 |
| 6,671,232 | B1 | 12/2003 | Stupp | |
| 8,094,396 | B1 * | 1/2012 | Zhang | G11B 27/36 360/31 |
| 9,070,377 | B1 | 6/2015 | Dakroub et al. | |
| 9,240,205 | B1 | 1/2016 | Gao et al. | |
| 9,495,995 | B1 * | 11/2016 | Zhu | G11B 5/02 |
| 9,558,769 | B1 * | 1/2017 | Kim | G11B 5/314 |
| 2007/0279791 | A1 * | 12/2007 | Mallary | G11B 5/855 360/69 |
| 2010/0277827 | A1 * | 11/2010 | Wood | G11B 5/012 360/75 |
| 2016/0118070 | A1 * | 4/2016 | Yang | G11B 5/4866 369/13.33 |
| 2016/0133286 | A1 * | 5/2016 | Lee | G11B 5/3133 369/13.33 |
| 2016/0133291 | A1 * | 5/2016 | Chen | G11B 5/314 369/13.33 |
| 2016/0351209 | A1 * | 12/2016 | Chen | G11B 5/314 |

* cited by examiner

*Primary Examiner* — Peter Vincent Agustin
(74) *Attorney, Agent, or Firm* — Hollingsworth Davis, LLC

(57) ABSTRACT

Data is written to a magnetic recording medium of a drive using a read/write head. The read/write head has an energy source that applies a hotspot to the magnetic recording medium while recording. During the writing, a steady-state current applied to the energy source is changed by a step value. A timing error induced by the change in the steady-state current is measured based on reading back the data. A thermal gradient of the hotspot is determined based on the step value and the timing error.

20 Claims, 7 Drawing Sheets

DETERMINING THERMAL GRADIENT OF HEAT-ASSISTED MAGNETIC RECORDING HOTSPOT BASED ON TIMING ERRORS

SUMMARY

The present disclosure is directed to determining thermal gradient of a heat-assisted magnetic recording hotspot based on timing errors. In one embodiment, a method involves writing data to a magnetic recording medium of a drive using a read/write head. The read/write head has an energy source that applies a hotspot to the magnetic recording medium while recording. During the writing, a steady-state current applied to the energy source is changed by a step value. A timing error induced by the change in the steady-state current is measured based on reading back the data. A thermal gradient of the hotspot is determined based on the step value and the timing error.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
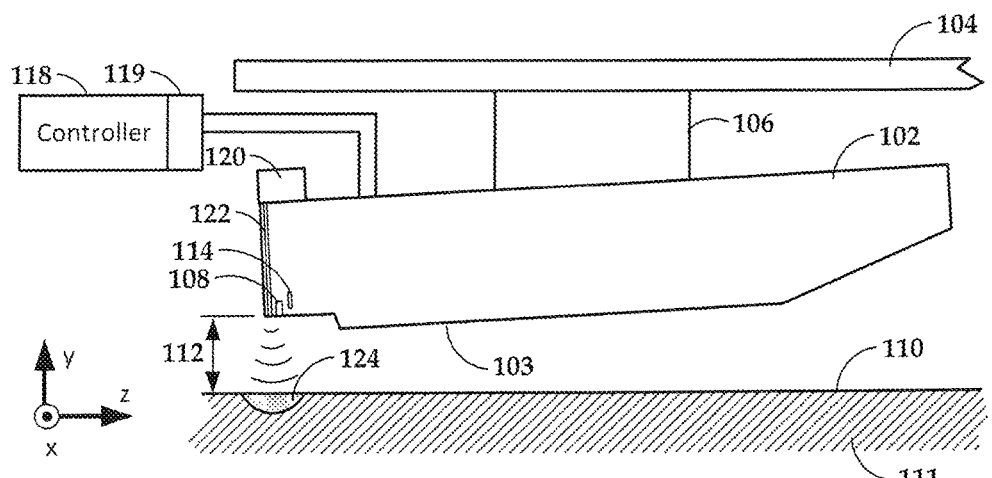
FIG. 1 is a view of a slider assembly according to an example embodiment.

The present disclosure generally relates to data storage devices that utilize magnetic storage media, e.g., disks. Data storage devices described herein use a particular type of magnetic data storage known heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the superparamagnetic effect.

A HAMR device uses a near-field transducer to concentrate optical energy into the optical spot in a recording layer. The hotspot raises the media temperature locally, reducing the writing magnetic field required for high-density recording. A waveguide integrated into a read/write head can be used to deliver light to the near-field transducer. Light from a light source, such as an edge-emitting laser diode, is coupled into the waveguide through waveguide input coupler or a spot size converter. The light source may be mounted to an outside surface of the read/write head.

Because the bit boundaries in a HAMR device are defined by the hotspot, the characteristics of the hotspot can have a significant effect on performance. For example, the thermal gradient is the change in temperature over distance at the boundaries of the hotspot. A sharp thermal gradient, in which temperature changes a relatively large amount over a relatively small distance, is strongly correlated to performance. For example, a sharp thermal gradient results in well-defined bit boundaries in the recorded tracks, and the bits are therefore easier to detect and decode as well as being able to be placed closer together.

This disclosure describes techniques used to measure thermal gradient in a HAMR device. These techniques can be used in-drive, meaning they do not rely on external measuring devices and can be used during qualification testing and use of the drive. The in-drive thermal gradient measurement is based on measuring the delta in time of a transition relative to its expected location as a function of a laser power increase. If the optical power sent to the media is increased rather abruptly, the location of the written transition will shift in time. For example, a power increase causes the transition to be written earlier in time whereas a power decrease causes the transition to be written latter in time. A measurement of that shift in time as function of the power change gives rise to an estimate of the thermal gradient provided by the HAMR head. These estimates of thermal gradient can be useful in testing and controlling HAMR drives.

In FIG. 1, a block diagram shows a side view of a HAMR read/write head 102 according to an example embodiment. The read/write head 102 may also be referred to herein as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disk.

A controller 118 is coupled to the read/write transducers 108, as well as other components of the read/write head 102, such as heaters 114, sensors, etc. The controller 118 may be part of general- or special-purpose logic circuitry that controls the functions of a storage device that includes at least the read/write head 102 and recording medium 111. The controller 118 may include or be coupled to a read/write channel 119 that include circuits such as preamplifiers, buffers, filters, digital-to-analog converters, analog-to-digital converters, decoders, encoders, etc., that facilitate electrically coupling the logic of the controller 118 to the signals used by the read/write head 102 and other components.

The illustrated read/write head 102 is configured as a HAMR device, and so includes additional components that form a hotspot 124 on the recording medium 111 near the read/write transducer 108. These components include a laser 120 (or other energy source) and a waveguide 122. The waveguide 122 delivers light from the laser 120 to components near the read/write transducers 108, such as a near-field transducer that emits a tightly focused stream of energy to form the hotspot 124. The read/write transducers 108 also include a magnetic pole that applies a magnetic field to the hotspot 124 and the surrounding area. Because of the high coercivity of the recording medium 111, only the hotspot 124 is affected by the magnetic field due to the material being heated above the Curie temperature. Therefore, the size and shape of the hotspot 124 affects the location of magnetic transitions written to the recording medium 111, which can affect the size and location of the bits of data defined by the transitions.

Figure 2:
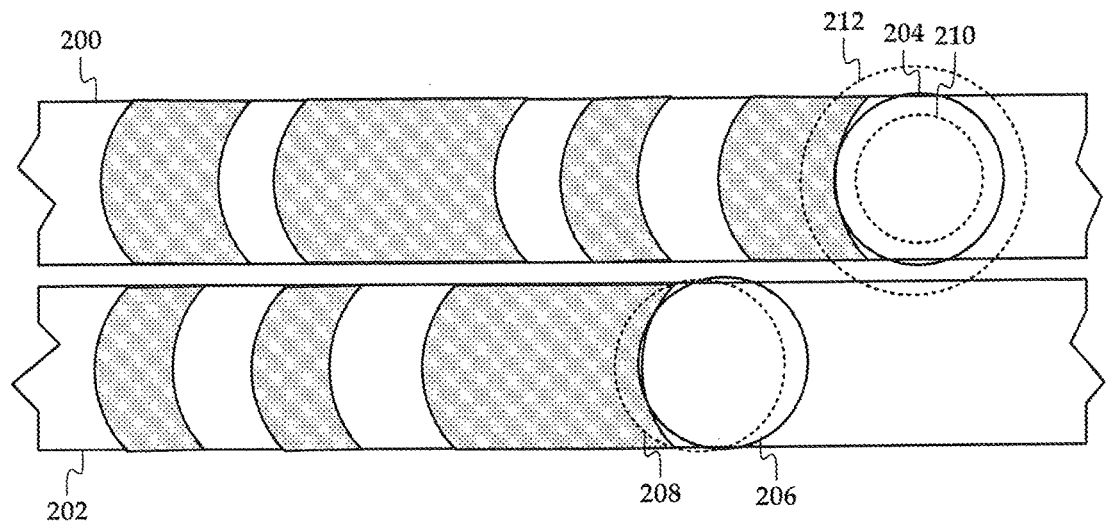
FIG. 2 is a diagram of recorded tracks according to an example embodiment.

Small changes in the laser's power can have significant effects on the recording process, and these effects may be seen in both the downtrack and crosstrack direction of the data tracks. An example of this is shown in the diagram of FIG. 2, which shows two adjacent tracks 200, 202 according to an example embodiment. The different shaded areas in the tracks 200, 202 represent regions of different magnetic orientation. Circles 204, 206 represent a nominal hotspot size on the tracks 200, 202, e.g., a hotspot size that is optimal given the desired track width and linear bit density of the tracks 200, 202. Under some conditions, the thermal profile of the spot size sent to the media may shift position without a significant decrease or increase in hotspot size, causing the written transition to occur earlier (or later) than expected. This case is represented by dashed circle 208, which indicates a momentary downtrack shift relative to the nominal hotspot 206. This is one example of a downtrack effect, which may be induced by mode hopping or other causes.

Downtrack effects may also occur when the hotspot size decreases or increases, with or without a position shift. In such a case, the written transition is written later or earlier than expected because the thermal profile of the spot size has changed. This is indicated by dashed circles 210, 212, which indicate a hotspot at respective lower and higher values than nominal 204. These variations 210, 212 can also result in crosstrack effects, such as increasing chances of encroachment when the hotspot is too big, and making the track too narrow when the hotspot is too small.

Figure 3:
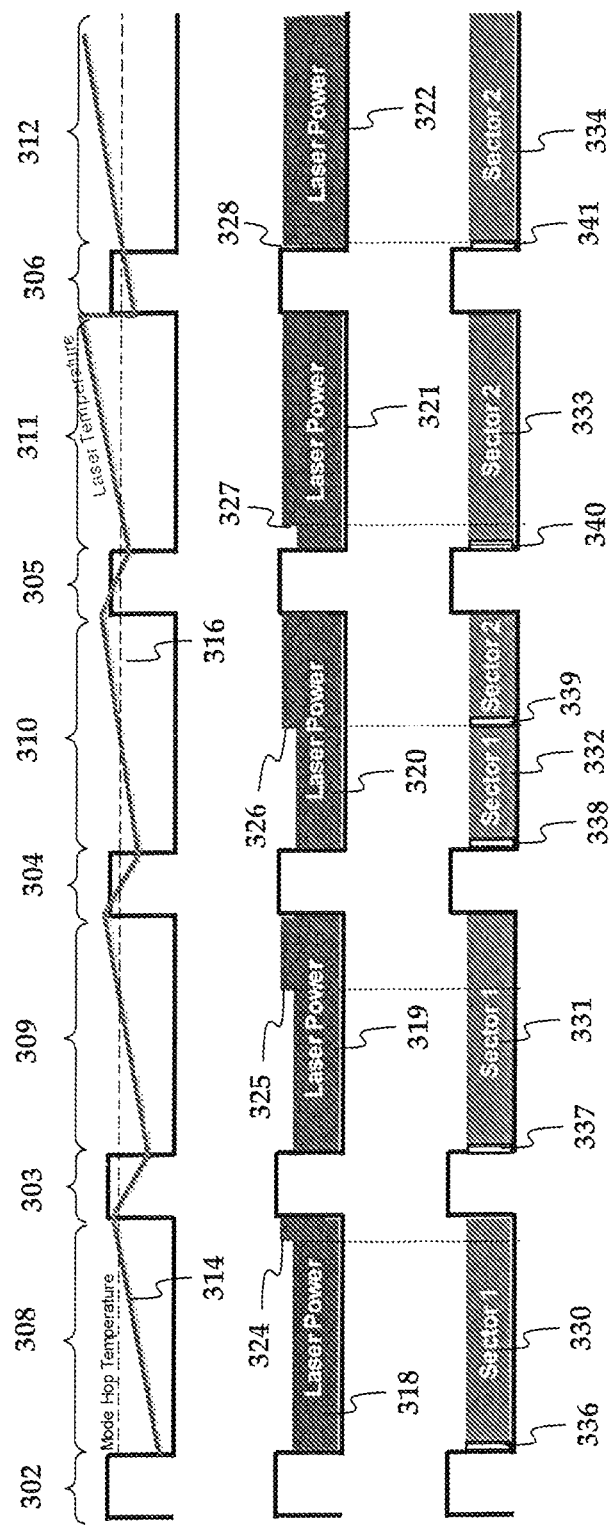
FIG. 3 is a diagram illustrating mode hops in a read/write head according to an example embodiment.

The above examples can occur in the middle of writing when a laser's power increases rather abruptly, sometimes called a mode hop. The result of a mode hop is that the timing of the written data is affected. This causes errors when trying to read back the data, because the bit transitions are not written where they are supposed to be relative to previously written bits or relative to reference datum such as preambles, servo marks, etc. In FIG. 3, a diagram shows how mode hops can affect various parts of the data sectors. Time periods 302-306 are when servo sectors are being traversed, during which no writing of the media occurs. Time periods 308-312 represent times when data portions are being traversed, during which writing occurs.

Curve 314 represents the time-varying laser temperature during recording, and dashed line 316 represents a threshold temperature above which mode hops occur. Areas 318-312 represent effective laser power applied to the recording medium while writing the data. The written data is represented by regions 330-334, which encompass two data sectors. Shaded areas 336-341 represent preambles/sync marks used by the decoder to detect the start of data.

The laser power curves 318-320 include transitions/steps 324-328 representing mode hops induced when the laser temperature 314 goes about the threshold temperature 316. As indicated by the vertical dashed lines extending from the transitions 324-328, the transitions 324-328 affect different regions of data recording in data regions 330-334. Transitions 324, 325, and 327 affect user data portions of the sectors. Transition 326 affects a preamble portion that is located between the two data sectors. Transition 328 affects a preamble portion that lies on the between the data region and a servo sector.

In embodiments described herein, a disk drive apparatus includes in-drive thermal gradient measurement based on measuring the delta in time of a transition relative to its expected location as a function of a power increase. If the power sent to the media is increased rather abruptly, the location of the written transition will shift in time. A power increase causes the transition to be written earlier in time whereas a power decrease causes the transition to be written latter in time. A measurement of that shift in time as function of the power change gives rise to an estimate of the thermal gradient of the HAMR head.

The relationship between the power change and transition shift is related by the following mathematical analysis shown below. The thermal profile of the NFT, T(x), as a function of position, x, is given in Equation (1) below, where $T_p$, $T_a$, and $\sigma$ are the peak temperature of the NFT's profile, the ambient temperature of the air, and the standard deviation of the NFT's thermal profile respectively.

$$T(x) = T_p e^{-\frac{x^2}{\sigma^2}} + T_a \quad (1)$$

Assuming that an injected power jump, $\Delta$, is small, then relation between the peak temperature before, $T_{p1}$, and after, $T_{p2}$, and the power jump $\Delta$ is shown in Equation (2) below.

$$T_{p2} = T_{p1} + \Delta \quad (2)$$

Substituting Equation 2 into Equation 1 for $T_p$, doing some rearranging, using natural log identities, and using a small power change approximation one arrives at the shift in position of the written transition, $\delta$, to be approximated as shown in Equations (3) and (4) below.

$$\delta = \frac{\sigma}{2\sqrt{\ln\left(\frac{T_p}{T_w - T_a}\right)}} A_\% \quad (3)$$

where $$A_\% = \Delta/T_p \quad (4)$$

The above equations describe a relationship between a power jump and a transition shift. This shift is in geometrical length, which can be converted to time based on common parameters of the drive. Next, taking the derivative of the thermal profile in Equation (1) with respect to x provides an equation for the thermal gradient $$\frac{dT}{dx} = T_p e^{-\frac{x_w^2}{\sigma^2}} \frac{-2x_w}{\sigma^2} \quad (5)$$

Where $x_w$ refers to the location of the write ("w" for write). If we do some more matheimcal rearrangements, solve for $x_w$, and subsequently evaluate that expression for $T_w$, the temperature at writing, an expression for thermal gradient, $T_g$, is shown in Equation (6) below.

$$T_g[k/\text{nm}] = \left|\frac{dT}{dx}\right| = (T_w - T_a)\frac{2\sqrt{\ln\left(\frac{T_p}{T_w - T_a}\right)}}{\sigma} \quad (6)$$

Plugging Equation 3 into Equation 6 yields the final relevant equation for this method $$\delta = \frac{(T_w - T_a)}{T_g} A_\% \quad (7)$$

Because $T_w$ and $T_a$ are known quantities, the transition shift $\delta$ (in nm) is affected only in response to a power change $\Delta$ sent to the media. Therefore, by inducing a change in power while recording an measuring transition shift, the results are plugged into Equation (7) to estimate $T_g$. A feature in the preamp can be implemented to accurately adjust the power sent to the media by a known amount while recording. Measuring the transition shift, which again is the shift in nm (or time) relative to the expected location of the transition, can also be determined by a feature in the current channel that measures disturbances in the read channel.

A hard disk read channel can generate errors of the read-back waveform by comparing it to the expected waveform. It can then feed these errors into a timing loop which is able to extract just the timing portion of these errors (as opposed to amplitude errors, for example). A read channel feature is able to quantify the size of the timing errors by comparing them to a programmable threshold. If the timing errors are greater than the threshold, the read channel will output a flag. The greater the threshold where non-zero flags are generated the larger the timing shift on the media is. In this example, a flag>0 indicates a timing error and flag=0 indicates no timing error, however other conventions may be used. The size of the timing error is the largest threshold value which still indicates a timing error, e.g., flag>0 in this example. While the value of the flag may also have some meaning (e.g., a flag value>1 indicating more or greater timing errors than flag=1), for purposes of this example, only the threshold region where the flags transition between zero and one are considered. The drive controller can be configured to calibrate timing error values into an actual physical shift in nm.

For example, the calibration to determine mapping between timing error and physical shift may involve associating first and second different write precompensation values with different first and second non-return-to-zero, inverted (NRZI) data patterns. The first and second different write precompensation values cause a predetermined phase shift to be written into test data that uses the first and second NRZI data patterns. The test data is used to determine a response of the storage device to the predetermined phase shift. An example of inducing a predetermined phase shift in this way is disclosed in commonly owned U.S. patent application Ser. No. 15/233,298, filed Aug. 10, 2016, which is incorporated by reference in its entirety. The phase shift corresponds to a percentage of a bit cell. Therefore once, the bit cell size is known, the bit shift in nanometers can be determined. The bit cell size is $2\pi rf/\omega$, where r is the track radius, f is the data frequency, and $\omega$ is the disk rotation speed. Therefore, the timing error induced by the predetermined phase shift can be measured, and thereby converted to a distance shift. With that calibration, the read channel can therefore count how many errors are occurring and how large they are, thereby obtaining $\delta$ in Equation 6.

If a HAMR drive is configured to controllably increase (or decrease) the laser current rather abruptly, this in turn increases (or decreases) the power sent to the media rather abruptly (reflected in the $\Delta_\%$ value). By calibrating a timing loop error detector, the value of $\delta$ can be measured. Measuring allows $\delta$ facilitates estimating $T_g$ using the generally know values of $T_w$ and $T_a$. Further, $\delta$ can be measured at multiple $A_\%$, which can be fit into a curve, The slope of the curve is proportional to $T_g$.

Figure 4:
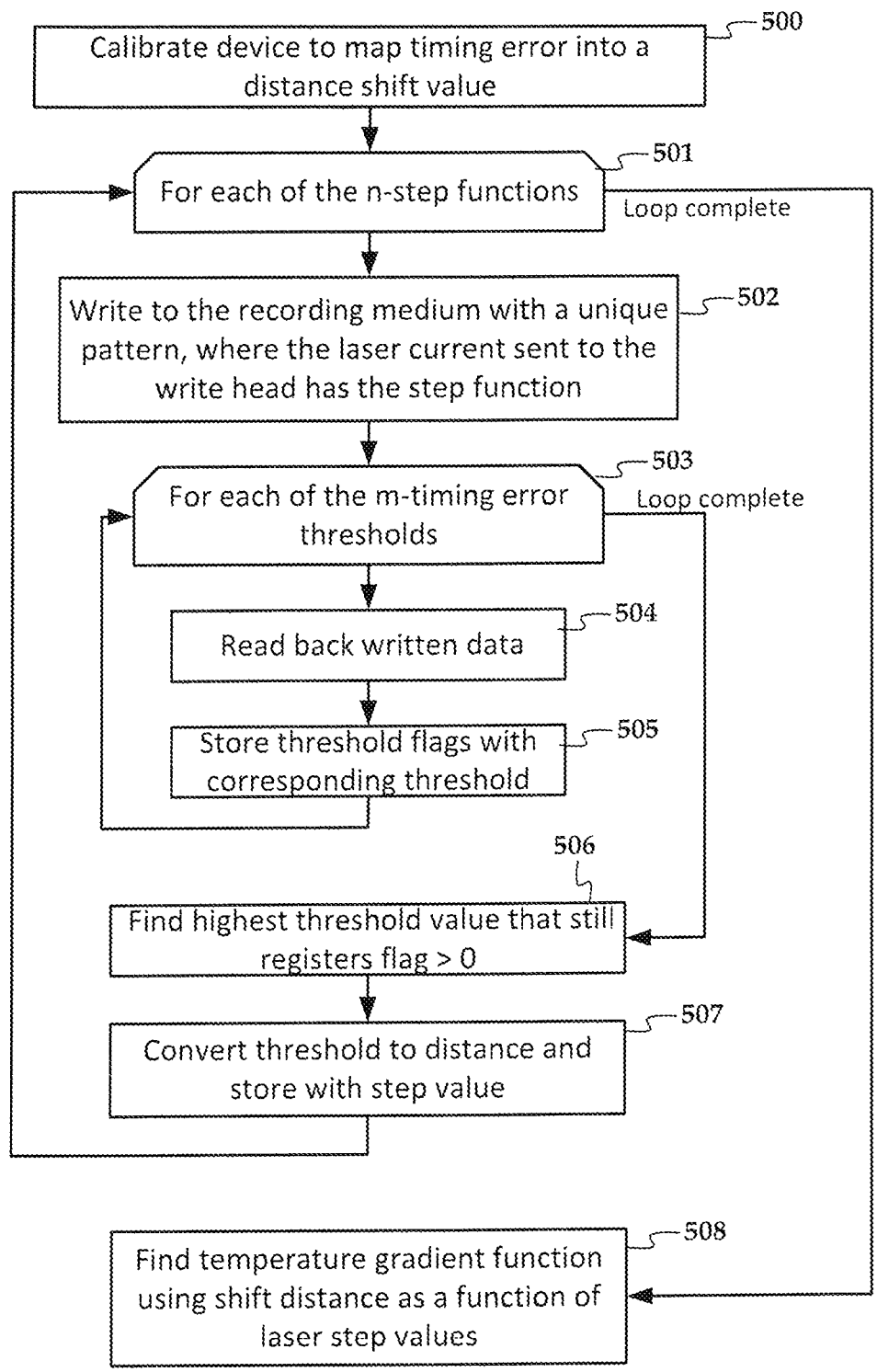
FIG. 4 is a flowchart of a method according to an example embodiment.

In FIG. 4, a flowchart shows a procedure according to an example embodiment. The device is calibrated 500 to map timing error parameter into a distance shift value, e.g., in nm. As represented by block 501, a step function is varied over a desired range (e.g., −7% to 7% in step sizes of 1%). For each step function, the recording medium is written to 502 (e.g., written to the same or different sectors, tracks, etc.) with a unique pattern that is advantageous for this calibration, where the laser current sent to the head has the step function in it.

Figure 5:
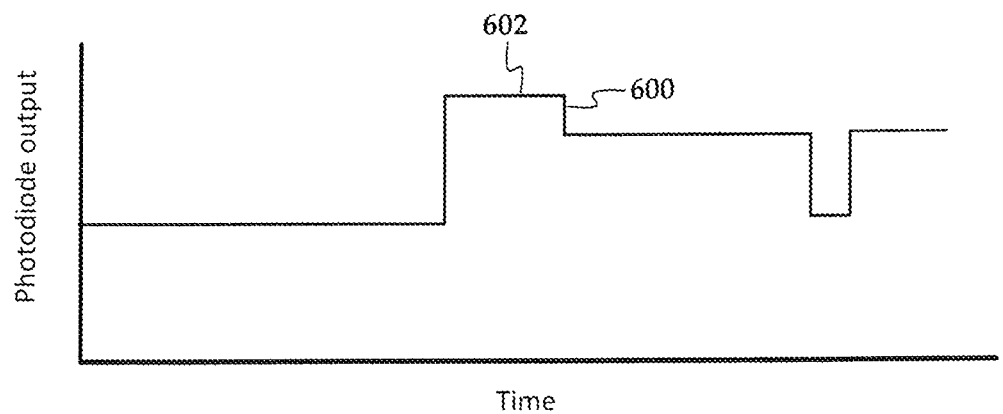
FIGS. 5, 6 and 7 are graphs showing signals and data used in the method shown in FIG. 4.

In FIG. 5 a graph shows the output of a photodetector (e.g., a photodiode or other a device which measure the laser's output light) where a rather abrupt shift 600 is seen in the output of the photodiode from a steady-state value 602. The steady-state photodiode value corresponds to the steady-state current applied to the laser just before the shift 600. The optical power being sent to the recording media has an abrupt shift that corresponds to the shift 600, resulting in a change in timing of the bit transitions being written to the media.

As indicated by loop limit 503, preamp timing error threshold parameter is set for a desired range of threshold values (e.g., 0 to 30 in step sizes of 1). For each timing threshold selected at block 503, some or all of the sectors and/or tracks that have this laser current step function written are read back 504. When reading back the data, the timing threshold error flags are stored 505 together with the corresponding threshold values. After exiting the loop 503, the stored flags and threshold values are used the find 506 the highest threshold value that registers a value greater than zero. This is illustrated in the graph of FIG. 6, which shows a plurality of flags as a function of a plurality of thresholds for a particular step value.

Figure 6:
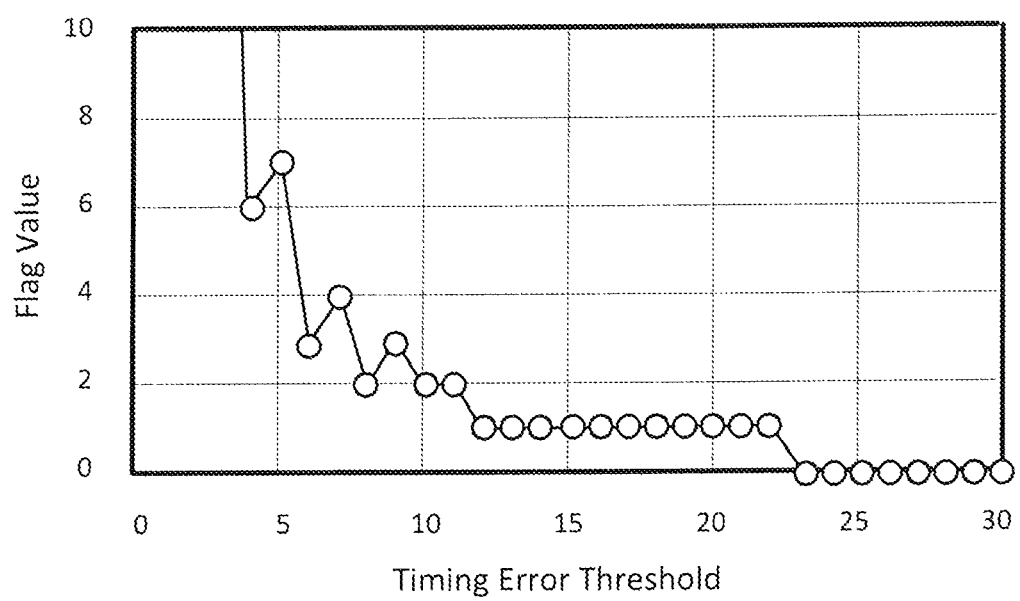

The value of interest in the graph in FIG. 6 is the highest timing error threshold value that still registers a flag>0. In this example, the threshold value that satisfies this criterion is 22. This means that at that power jump, the flag indicates a timing error as large as 22, which can be converted to a shift in time or in physical units such as nm via a calibration method. In reference again to FIG. 4, the time threshold value is converted 507 to a distance, and is stored together with the corresponding step value used with this iteration. Outer loop 501 continues with the next laser step value, during which blocks 504-507 repeat with this step value.

Figure 7:
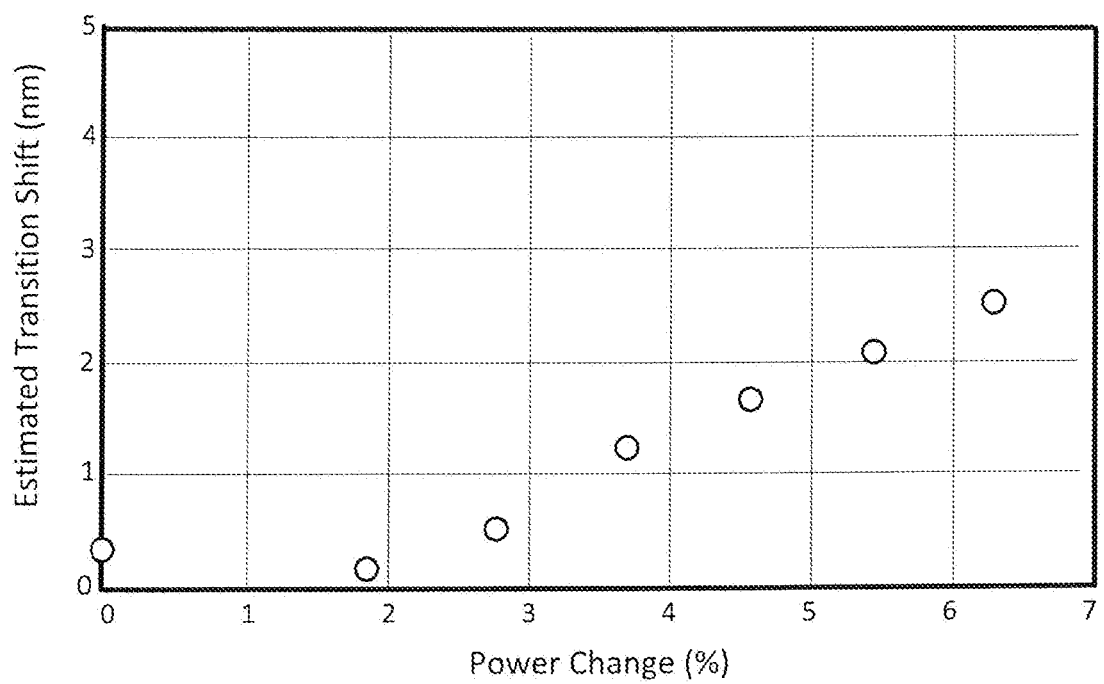

After all step values have been tested, loop 501 exits and the stored data are used to find 508 a thermal gradient function. An example of this function is shown in the graph of FIG. 7, which is a plot of estimated transition shift in units of distance as a function of laser power step change. A mathematical fit can be used to determine an equation similar to Equation (7), with the slope being inversely proportional to $T_g$.

It will be understood that there may be many variations in the method shown in FIG. 4. For example, the setting 501 of step functions and writing 502 may occur within its own loop, such that n-segments of data (e.g., n-tracks) are all written at once with different step function values. Thereafter, each of the segments is read back in turn to perform the other parts 503-508 of the procedure. Other steps may be optional. For example, if the timing error relationship to distance shift is known, then the operation in block 500 may not need to be performed every time the other operations are performed.

Figure 8:
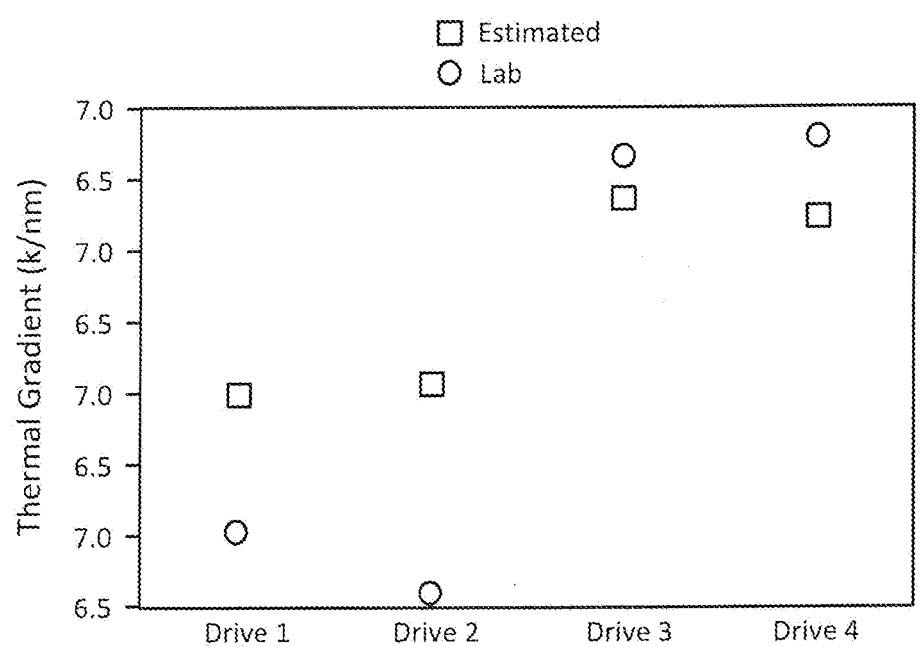
FIG. 8 is a graph showing experimental results obtained using the method shown in FIG. 4.

A method as shown in FIG. 4 was run on four drives, and their estimated thermal gradients were compared with the values provided by a lab test. The result is shown in the graph of FIG. 8. The graph shows that the estimation compares favorably with more direct form of measurement in the lab test.

Figure 9:
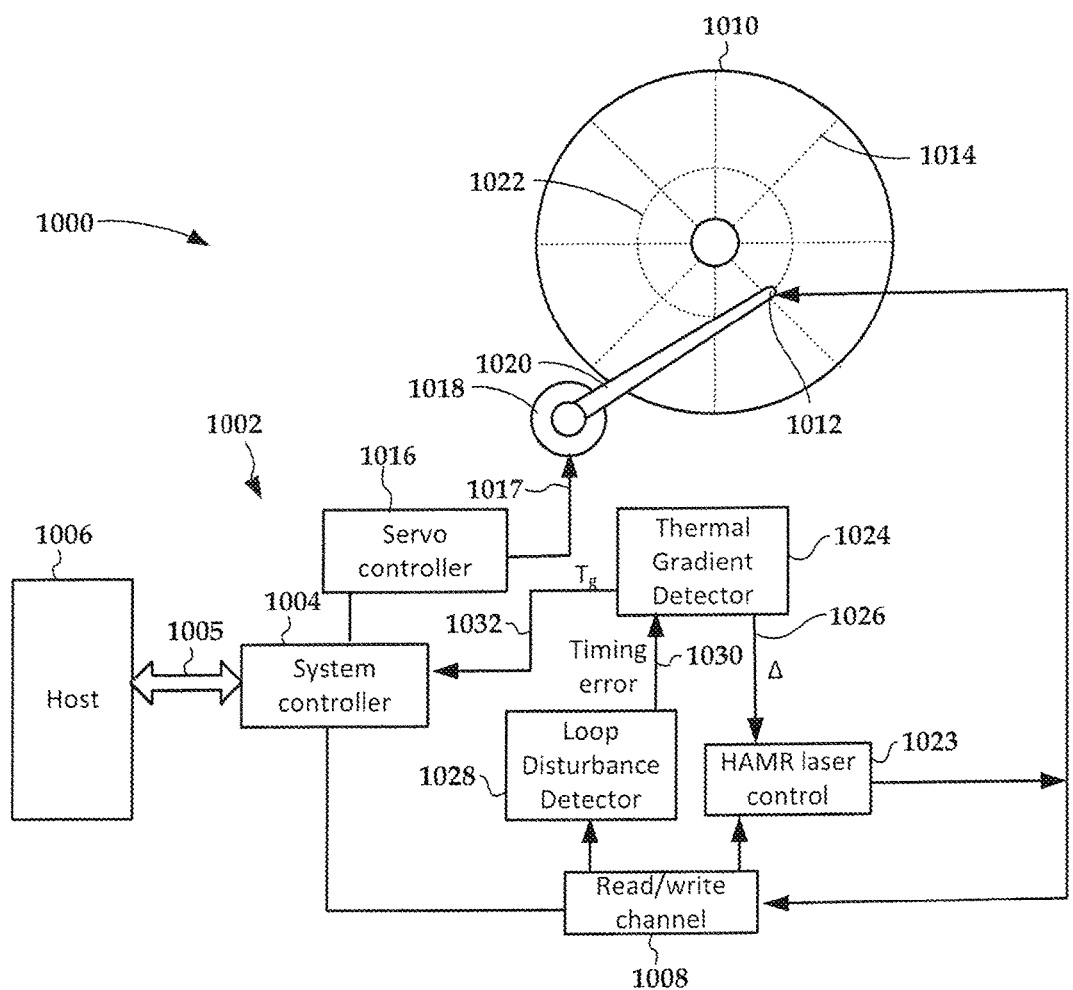
FIG. 9 is a block diagram of an apparatus according to an example embodiment.

In FIG. 9, a block diagram illustrates a hard disk drive apparatus 1000 according to an example embodiment. Control logic circuit 1002 of the drive 1000 includes a system controller 1004 that processes read and write commands and associated data from a host device 1006. The host device 1006 may include any electronic device that can be communicatively coupled via host interface 1005 to store and retrieve data from a data storage device, e.g., a computer, peripheral card, etc. The data controller 1004 is coupled to a read/write channel 1008 that reads from and writes to a surface of a magnetic disk 1010.

The read/write channel 1008 generally converts data between the digital signals processed by the data controller 1004 and the analog signals conducted through one or more read/write heads 1012 during read operations. To facilitate the read operations, the read/write channel 1008 may include analog and digital circuitry such as preamplifiers, filters, decoders, digital-to-analog converters, timing-correction units, etc. The read/write channel 1008 also provides servo data read from servo wedges 1014 on the magnetic disk 1010 to a servo controller 1016. The servo controller 1016 uses these signals to provide a voice coil motor control signal 1017 to an actuator 1018. The actuator 1018 moves an arm 1020 upon which the read/write heads 1012 are mounted in response to the voice coil motor control signal 1017.

The disk drive 1000 is a HAMR device, and therefore the read/write heads 1012 include an energy source (e.g., laser diode) that heats the magnetic disk 1010 when recording. A HAMR laser controller 1023 sends a current to activate the laser diode when recording. As will be described below, the HAMR laser controller 1023 includes the ability to shift a steady-state write current being applied to the laser during recording, resulting in a corresponding jump in optical power applied to the disk 1010.

The disk drive 1000 includes a thermal gradient detector 1024 that can estimate the thermal gradient of hotspots written to the disk 101 via the laser. The thermal gradient detector 1024 applies a laser current shift 1026 while writing test data to one or more segments (e.g., tracks sectors) of the disk 1010. When reading back the test data, a loop disturbance detector 1028 detects a timing error 1030. The thermal gradient detector 1024 uses this timing error along with the current shift 1026 to estimate thermal gradient 1032. The system controller 104 can use this thermal gradient data 1024 for, among other things, evaluation and calibration of the drive during qualification testing, performance testing during use of the drive, etc. The detector 1024 allows an in-drive measurement of the thermal gradient, as opposed to the spinstand measurement. A drive measurement is faster and cheaper, and therefore can provide large scale feedback. The estimated thermal gradient 1032 provides an additional metric of performance, one which is a good predictor of performance (e.g., bit error rate). The detector 1024 can also be used in the field to predict health of a fielded drive, e.g., when a drive is about to fail, is in need of a calibration and/or other changes.

Figure 10:
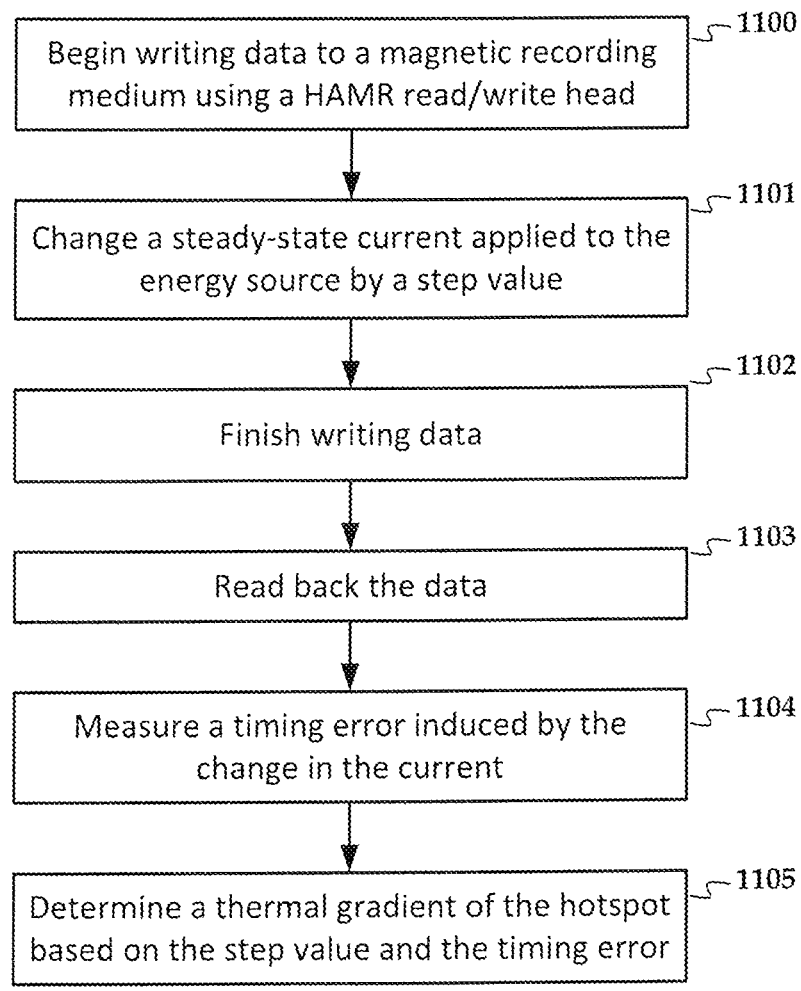
FIG. 10 is a flowchart of a method according to an example embodiment.

In reference now to FIG. 10, a flowchart illustrates a method according to an example embodiment. The method involves writing 1100 data to a magnetic recording medium of a drive using a HAMR read/write head, e.g., one that has an energy source that applies a hotspot to the magnetic recording medium while recording. During the writing, a steady-state current applied to the energy source is changed 1101 by a step value. After writing is finished 1102, the data is read back 1103 and a timing error induced by the change in the steady-state current is measured 1105. A thermal gradient of the hotspot is determined based on the step value and the timing error. The step value and timing error may be converted to respective temperature changes and distance shifts as part of determining 1105 the thermal gradient.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
    writing data to a magnetic recording medium of a drive using a read/write head comprising an energy source that applies a hotspot to the magnetic recording medium while recording;
    during the writing, changing a steady-state current applied to the energy source by a step value;
    measuring a timing error induced by the change in the steady-state current based on reading back the data; and
    determining a thermal gradient of the hotspot based on the step value and the timing error.

2. The method of claim 1, wherein determining the thermal gradient of the hotspot based on the step value and the timing error comprises converting the timing error to a distance value and converting the step value to percentage of the steady-state current.

3. The method of claim 2, further comprising calibrating the drive to determine a mapping between the timing error and the distance value, the calibration involving writing different adjacent first and second non-return-to-zero, inverted data patterns to induce a predetermined phase shift when reading back the data patterns.

4. The method of claim 1, further comprising using the thermal gradient in calibration or evaluation of the drive during a qualification test.

5. The method of claim 1, further comprising using the thermal gradient to predict health of the drive in the field.

6. The method of claim 1, wherein measuring the timing error comprises:
    iterating through a series of timing error threshold values, each iteration comprising, for each threshold value:
    reading back the data; and
    determining a flag indicating the existence of a timing error.

7. The method of claim 6, wherein a size of the timing error is the largest threshold value whose flag indicates the timing error.

8. The method of claim 1, wherein a plurality of different step values are used to determine a plurality of corresponding timing errors, and wherein the plurality of timing errors are converted to a plurality of corresponding distance values, a slope of the distance values as a function of the step values being used to determine the thermal gradient.

9. An apparatus comprising:
  circuitry configured to communicate with a read/write head, the read/write head comprising an energy source that applies a hotspot to the magnetic recording medium while recording; and
  a controller coupled to the circuitry and configured to:
    write data to the magnetic recording medium of a drive using the read/write head;
    during the writing, change a steady-state current applied to the energy source by a step value;
    measure a timing error induced by the change in the steady-state current based on reading back the data; and
    determine a thermal gradient of the hotspot based on the step value and the timing error.

10. The apparatus of claim 9, wherein determining the thermal gradient of the hotspot based on the step value and the timing error comprises converting the timing error to a distance value and converting the step value to percentage of the steady-state current.

11. The apparatus of claim 10, wherein the controller is further configured to calibrate the drive to determine a mapping between the timing error and the distance value, the calibration involving writing different adjacent first and second non-return-to-zero, inverted data patterns to induce a predetermined phase shift when reading back the data patterns.

12. The apparatus of claim 9, wherein the controller is further configured to use the thermal gradient in calibration or evaluation of the drive during a qualification test.

13. The apparatus of claim 9, wherein the controller is further configured to use the thermal gradient to predict health of the drive in the field.

14. The apparatus of claim 9, wherein measuring the timing error comprises:
  iterating through a series of timing error threshold values, each iteration comprising, for each threshold value:
  reading back the data; and
  determining a flag indicating the existence of a timing error, wherein a size of the timing error is the largest threshold value whose flag indicates the timing error.

15. The apparatus of claim 9, a plurality of different step values are used to determine a plurality of corresponding timing errors, and wherein the plurality of timing errors are converted to a plurality of corresponding distance values, a slope of the distance values as a function of the step values being used to determine the thermal gradient.

16. A method comprising:
  for each of a plurality of step values applied to a steady-state current of a laser, changing the steady-state current by the step value while writing data to one or more segments of a magnetic recording medium;
  measuring a plurality of timing errors corresponding to each of the step values while reading back the one or more segments; and
  based on a relation between the plurality of timing errors and the plurality of step values, determining a thermal gradient of a hotspot applied to the magnetic recording medium by the laser.

17. The method of claim 16, further comprising converting the plurality of timing errors to a plurality of distance shift values via a procedure that involves writing different adjacent first and second non-return-to-zero, inverted data patterns to induce a predetermined phase shift when reading back the data patterns.

18. The method of claim 17, wherein the thermal gradient is determined based on slope of the distance shift values as a function of the corresponding plurality of step values.

19. The method of claim 16, further comprising using the thermal gradient in calibration or evaluation of the drive during a qualification test.

20. The method of claim 16, further comprising using the thermal gradient to predict health of the drive in the field.

* * * * *